United States Patent [19]

Kuisl

[11] Patent Number: 4,564,378
[45] Date of Patent: Jan. 14, 1986

[54] METHOD FOR PRODUCING A PREFORM FOR LIGHT WAVEGUIDES

[75] Inventor: Max Kuisl, Ulm, Fed. Rep. of Germany

[73] Assignee: Licentia Patent-Verwaltungs-GmbH, Frankfurt am Main, Fed. Rep. of Germany

[21] Appl. No.: 578,573

[22] Filed: Feb. 9, 1984

[30] Foreign Application Priority Data

Feb. 11, 1983 [DE] Fed. Rep. of Germany ....... 3304721

[51] Int. Cl.⁴ ........................................... C03B 37/01
[52] U.S. Cl. .................................... 65/3.12; 65/18.2; 427/255.2
[58] Field of Search ...................... 65/18.2, 18.3, 3.12, 65/3.11, 2; 427/255.3, 255.2, 255, 314

[56] References Cited

U.S. PATENT DOCUMENTS

| | | | |
|---|---|---|---|
| 3,459,673 | 8/1969 | Best et al. | 252/301.4 |
| 4,002,512 | 1/1977 | Lim | 65/3 X |
| 4,253,863 | 3/1981 | Iyengar | 65/3 X |
| 4,261,722 | 4/1981 | Novak et al. | 65/60.51 X |
| 4,263,032 | 4/1981 | Sinclair et al. | 65/3.12 |
| 4,414,012 | 11/1983 | Suto et al. | 65/18.2 |
| 4,432,781 | 2/1984 | Okamoto et al. | 65/18.2 |

FOREIGN PATENT DOCUMENTS

| | | |
|---|---|---|
| 0055822 | 7/1982 | European Pat. Off. . |
| 2178178 | 11/1973 | France . |
| 2321459 | 3/1977 | France . |
| 2389146 | 11/1978 | France . |
| 55-144429 | 11/1980 | Japan ................................. 65/3.12 |
| 1559768 | 1/1980 | United Kingdom . |

OTHER PUBLICATIONS

Kazunori Chida et al., "Fabrication of OH-Free Multimode Fiber by Vapor Phase Axial Deposition", pp. 1883-1889; IEEE Journal of Quantum Electronics, vol. QU-18, No. 11; Nov. 1982.

Michael G. Blankenship et al., "The Outside Vapor Deposition Method of Fabricating Optical Waveguide Fibers", pp. 1418-1423; IEEE Journal of Quantum Electronics, vol. QU-18; No. 10; Oct. 1982.

*Primary Examiner*—Kenneth M. Schor
*Attorney, Agent, or Firm*—Spencer & Frank

[57] ABSTRACT

A method of producing a preform for light waveguides wherein glass-forming chlorides, e.g. $SiCl_4$ and/or $GeCl_4$, are reacted with water vapor to form a glass forming layer, e.g. $SiO_2$ soot. This reaction advantageously takes place at relatively low temperatures, e.g. 20° C.–800° C. Surprisingly, almost no $SiO_2$ deposition takes place on higher heated surfaces, e.g. in the reaction chamber. Elimination of annoying $OH^-$ ions is possible.

8 Claims, No Drawings

METHOD FOR PRODUCING A PREFORM FOR LIGHT WAVEGUIDES

BACKGROUND OF THE INVENTION

The present invention relates to a method for producing a preform for light waveguides. More particularly, the present invention relates to a method for producing a preform for light waveguides wherein at least one glass forming layer is precipitated from a glass-forming gas and/or vapor mixture.

The present invention relates in particular to a method wherein a substrate (basic body) is coated on its exterior to initially produce a preform tube which is subsequently collapsed into a glass rod. From this glass rod, the light waveguide is then drawn. The periodical "IEEE of Quantum Electronics", Vol. QE-18 (1982), page 1418, discloses a process for exterior coating (Outside Vapor Deposition, OVD) wherein a burner is moved axially along a rod. Glass-forming gases and/or vapors are fed to this burner so that it becomes possible to externally deposit glass-forming layers. Such a process has the drawback that no high precipitation rates can be realized with just a single burner. To increase the rate of deposition along the outer surface of the rod in such a process, it is necessary to have a burner which emits a linear flame. However, such a flame contains instabilities which lead to annoying irregularities in the coating.

SUMMARY OF THE INVENTION

It is therefore the object of the present invention to provide an economically operating process of the same type as discused above which permits, in particular, the production of large-area and uniform coatings and wherein, additionally, impurities in the resulting coating are avoided.

The above object is achieved according to the present invention by a method for producing a preform for a light waveguide which comprises providing a mixture containing at least one glass-forming chloride gas and water vapor, and reacting the glass-forming chloride gas with the water vapor in a manner to precipitate at least one glass-forming layer.

According to features of the invention, the glass-forming layer is precipitated on a substrate which has a lower temperature than its environment, e.g., the remainder of the reaction chamber; the mixture contains at least silicon tetrachloride ($SiCl_4$) and/or germanium tetrachloride ($GeCl_4$); and the substrate may be a carrier tube, preferably of graphite, through which a coolant, e.g. water, is conducted.

According to still further features of the invention the substrate is cooled to a temperature of from 20°-800° preferably approximately 20° C., and the remainder of the reaction chamber is heated to a higher temperature, e.g. 1000° C.

Finally according to still a further feature of the invention, after precipitation of the glass-forming layer, the layer is converted to a glassy layer by heating same in a gas and/or vapor atmosphere which prevents development of hydroxyl ($OH^-$) ions.

One advantage of the present invention is that the deposition of a glass-forming coating can take place at such low temperatures that material problems, e.g. the heat resistance of the materials employed for the coating arrangement, can nearly be neglected.

DETAILED DESCRIPTION OF THE PREFERRED EMBODIMENT

The present invention will now be explained in greater detail with the aid of an embodiment.

Known chemical vapor deposition processes, e.g. the MCVD (modified chemical vapor deposition process) for producing light waveguide preforms of quartz glass, are based on a reaction of silicon tetrachloride ($SiCl_4$) with oxygen ($O_2$). This reaction requires temperatures of approximately 1600° C. to get started. The major impediment in the technological mastery of a deposition using this process over the entire length of the preform is this high temperature which prohibits the use of many structural materials and additionally requires a large amount of energy.

If, however, according to the present invention, a glass-forming chloride, e.g. $SiCl_4$, is reacted with water vapor to form a glass-forming layer, this reaction advantageously takes place at substantially lower temperatures, e.g. in a temperature range from 20° C. to 800° C. During this reaction, annoying $OH^-$ ions may develop which lead to optical losses. However, elimination of the $OH^-$ ions is possible, e.g. according to a method described in the periodical, IEEE Journal of Quantum Electronics, Vol. QE 18 (1982), page 1883. It is now a surprise that the deposition of a glass-forming layer according to the present invention, e.g. doped and/or undoped $SiO_2$, from the exemplary reaction partners $SiCl_4$ and vaporous $H_2O$ preferably takes place at low temperatures, e.g. at a room temperature of 20° C. At higher temperatures, e.g. at 1000° C., another reaction takes place. This reaction occurs in the interior of the gas stream and not on the surface of the substrate. The product is an $SiO_2$ aerosol which also can be used for forming a soot preform. In this case, the walls of the reaction chamber must be kept at a high temperature to prevent deposition of the aerosol particles on the walls. This transport of the particles to the preform is achieved by a laminar flowing gas stream. This characteristic of the reaction permits preferred deposition of the glass-forming layer on a substrate, e.g. a carrier tube, while undesired deposition in the remaining reaction area is prevented in that the remaining reaction area is heated, e.g. to a temperature of 1000° C.

For the exemplary production of a light waveguide preform, the gas and/or vaporous reaction partners $SiCl_4$ and $H_2O$ are introduced into a reaction chamber by means of a carrier gas. This can be, e.g., nitrogen, oxygen or helium. But working without a carrier gas is possible also because the chemical reaction of $SiCl_4$ with $H_2O$ creates vaporous hydrogen chloride (HCl) which now acts as a carrier gas.

The reaction chamber into which the gas and water vapor mixture is introduced, is heated from all sides to a temperature of, e.g. 1000° C. Disposed in the reaction chamber is a substrate, i.e. a graphite tube, which is cooled by water or a gas stream or radiation flowing through its interior to a temperature of between 20° C. and 800° C., and preferably to a temperature closer to 20° C. The major portion of the resulting $SiO_2$ is now precipitated on this substrate in the form of a solid white layer ("soot"). In a subsequent heating process, the deposition product, which is comprised of individual particles that adhere to one another, on the graphite substrate is converted into a glassy preform. This heating step is carried out in a gas and/or vapor atmosphere which prevents the development of hydroxyl ($OH^-$)

ions in the resulting glassy layer. This dehydration and consolidation process is carried out in an atmosphere which contains chlorine gas and oxygen. The porous preform is pulled with constant velocity through a heated zone. Temperatures needed are 900° C. to 1350° C. In a second step, the dehydrated preform is heated up to 1550° C. in the same reaction chamber to create a transparent preform. Normally a flushing with oxygen is used to prevent vaporization of $GeO_2$. An additional flushing with helium is possible to get a bubble-free and transparent preform.

Due to the reduction of the reaction chamber temperature from about 1600° C., as in the prior art process, to about 1000° C., as in the process according to the present invention, the material problem is no longer acute and there is a saving in energy. If germanium tetrachloride is added to the reaction mixture, no difficulties arise since $GeCl_4$ reacts with water vapor in the same manner as $SiCl_4$. The advantage is here that the water vapor converts the $GeCl_4$ completely to germanium oxide ($GeO_2$) which is used as a dopant for the deposited layer to provide an increase in the index of refraction of the $SiO_2$. In the prior art reactions of $GeCl_4$ with $O_2$, it is not possible to realize complete conversion to $GeO_2$.

The present invention is not limited to the described embodiment but can be used similarly in other processes, e.g. in the VAD (vapor phase axial deposition) process as well as in the so-called interior MCVD processes.

EXAMPLE 1

A gas containing silicon tetrachloride vapor and a water vapor is prepared by bubbling the carrier gas nitrogen through two flasks, one filled with liquid $SiCl_4$ and the other with water. The amount of evaporated $SiCl_4$ and $H_2O$ can be adjusted by the flow of carrier gas and the temperature of the flasks. Stoichiometric proportions of the reaction components are available when 30 /h of $N_2$ is bubbling through liquid $SiCl_4$ held at 21° C. and 60 /h of $N_2$ bubbling through water held at 75° C. Optical fibers have doped glassy layers to provide the needed difference of the refractive index between the core and the cladding. This doping is done by bubbling the carrier gas nitrogen through a third flask filled with a mixture of liquid $SiCl_4$ and $GeCl_4$. Normally 0 to 10% of germanium (Ge) is added to the silicon glass to produce the desired difference of the refractive index. Gas coming from the bubbling flasks is introduced into a reactor chamber which is heated to 500° C. After passing a reactor length of 0.4 m the gases are led to the preform surface where the deposition of silicon oxide layers takes place. A graphite tube with a diameter of 0.03 m is used as a carrier for the deposited soot. For cooling, a water flow of 5 /min through the graphite tube is sufficient.

EXAMPLE 2

A vapor support equipment is used as described in Example 1. But now oxygen is used as a carrier gas. The reaction chamber is heated up to 1000° C. $SiO_2$ particles are produced in the gas volume. These particles are led to a preform rod by the carrier gas stream. The preform substrate also consists of graphite. The preferable diameter of the rod is 0.03 m, the length can be adapted to the lateral dimensions of the reaction chamber and the gas support. The carrier gas stream is adjusted to very low values (45 /h), while the temperature of the $SiCl_4$ and $H_2O$ evaporation flasks are relatively high (50° C. and 90° C.). Partial pressures of the reaction components in the gas are therefore high and a great mass transport of glass particles is possible. By inertial forces, 10% to 20% of the particles are deposited on the preform. The admixed oxygen reacts with the resulting HCl and forms chlorine ($Cl_2$). According to the dehydration reaction this gas mixture can act in the same way while deposition is performed.

There is no need to explain the further steps of dehydration, consolidation and vitrification because there exists a lot of literature about this subject e.g. in the references cited in the text above.

It will be understood that the above description of the present invention is susceptible to various modifications, changes and adaptations, and the same are intended to be comprehended within the meaning and range of equivalents of the appended claims.

What is claimed is:

1. In a method of producing a glasy preform for a light waveguide including depositing a glass forming layer on a tubular substrate disposed in a reaction chamber, and subsequently subjecting said glass forming layer to a heating process to convert said glass forming layer to a glassy layer; the improvement wherein said step of depositing comprises: providing a gaseous mixture of silicon tetrachloride ($SiCl_4$) gas and water vapor; cooling and maintaining said substrate at a temperature between 20° C. and 800° C. while heating said reaction chamber to a temperature of substantially greater than 800° C.; and flowing a stream of said gaseous mixture through the reaction chamber to react said silicon tetrachloride gas with said water vapor to precipitate a glass forming layer of silicon dioxide particles from the reacted gas and water vapor on the cooled substrate.

2. A method as defined in claim 1 wherein said temperature of the substrate is maintained at approximately 20° C.

3. A method as defined in claim 1 wherein the reaction chamber is heated to a temperature of approximately 1000° C.

4. A method as defined in claim 1 wherein said mixture additionally contains germanium tetrachloride ($GeCl_4$) gas.

5. A method as defined in claim 1 wherein said glass-forming layer is precipitated on the exterior surface of the tubular substrate; and said step of cooling includes conducting a coolant through the interior of the tubular substrate.

6. A method as defined in claim 5 wherein the substrate contains graphite and the coolant is water.

7. A method as defined in claim 1 wherein said heating process is effected in a gas or vapor atmosphere which prevents development of hydroxyl ($OH^-$) ions.

8. A method as defined in claim 1 wherein the mixture further contains oxygen gas which reacts with the HCl gas produced in the reaction chamber to produce chlorine gas which acts as a dehydrating component.

* * * * *